(12) United States Patent
Iwamura

(10) Patent No.: US 7,463,877 B2
(45) Date of Patent: *Dec. 9, 2008

(54) PLC BREAKER BRIDGE

(75) Inventor: Ryuichi Iwamura, San Diego, CA (US)

(73) Assignees: Sony Corporation, Tokyo (JP); Sony Corporation Inc., Park Ridge, NJ (US)

( * ) Notice: Subject to any disclaimer, the term of this patent is extended or adjusted under 35 U.S.C. 154(b) by 327 days.

This patent is subject to a terminal disclaimer.

(21) Appl. No.: 11/378,022

(22) Filed: Mar. 17, 2006

(65) Prior Publication Data

US 2006/0187023 A1 Aug. 24, 2006

Related U.S. Application Data

(63) Continuation-in-part of application No. 11/297,528, filed on Dec. 8, 2005.

(60) Provisional application No. 60/645,900, filed on Jan. 21, 2005.

(51) Int. Cl.
*H04M 9/00* (2006.01)
(52) U.S. Cl. .................. 455/402; 455/41.1; 340/310.17
(58) Field of Classification Search ................ 455/41.1, 455/41, 402, 270
See application file for complete search history.

(56) References Cited

U.S. PATENT DOCUMENTS

| | | | | |
|---|---|---|---|---|
| 4,627,052 A | * | 12/1986 | Hoare et al. | ................ 370/402 |
| 6,741,439 B2 | * | 5/2004 | Parlee et al. | ................ 361/119 |
| 6,947,409 B2 | | 9/2005 | Iwamura | |

(Continued)

OTHER PUBLICATIONS

U.S. Appl. No. 10/879,445, filed Jun. 29, 2004, Iwamura.

(Continued)

*Primary Examiner*—Nick Corsaro
*Assistant Examiner*—Vladimir Magloire
(74) *Attorney, Agent, or Firm*—Miller Patent Services; Jerry A. Miller

(57) ABSTRACT

In accordance with certain embodiments consistent with the invention, a power line communication (PLC) bridge circuit, consistent with certain embodiments, has a first coupler that couples data signals to and from a main power line circuit. A second coupler couples data signals to and from a branch power line circuit, wherein the branch power line circuit is branched from the main power line circuit. A first communication transceiver is connected to the first coupler for transferring data signals to and from the first coupler. A second communication transceiver is connected to the second coupler for transferring data signals to and from the second coupler. A controller examines data signals from the first transceiver and determines if the data is destined for the second transceiver, so that data that is not destined for the second transceiver is considered local data. The controller also examines data signals from the second transceiver and determines if the data is destined for the first transceiver, so that data that is not destined for the first transceiver is also considered local data. A bridge passes data signals between the first communication transceiver and the second transceiver when the controller determines that the data is not local, and passes data signals between the first communication transceiver and the second communication transceiver when the controller determines that the data is local. This abstract is not to be considered limiting, since other embodiments may deviate from the features described in this abstract.

31 Claims, 15 Drawing Sheets

U.S. PATENT DOCUMENTS

| | | |
|---|---|---|
| 6,977,578 B2 * | 12/2005 | Kline ......................... 370/501 |
| 2004/0135676 A1 | 7/2004 | Berkman et al. |
| 2004/0151390 A1 | 8/2004 | Iwamura |
| 2004/0177167 A1 | 9/2004 | Iwamura et al. |
| 2004/0184406 A1 | 9/2004 | Iwamura |
| 2004/0208139 A1 * | 10/2004 | Iwamura .................... 370/321 |
| 2004/0261101 A1 | 12/2004 | Iwamura |
| 2005/0013307 A1 | 1/2005 | Park |
| 2005/0015805 A1 | 1/2005 | Iwamura |
| 2005/0018766 A1 | 1/2005 | Iwamura |
| 2005/0047379 A1 | 3/2005 | Boyden et al. |
| 2005/0063355 A1 | 3/2005 | Iwamura |
| 2005/0076148 A1 | 4/2005 | Chan et al. |
| 2005/0108760 A1 | 5/2005 | Iwamura |
| 2005/0168326 A1 | 8/2005 | White, II et al. |
| 2005/0210295 A1 | 9/2005 | Iwamura |
| 2005/0213874 A1 | 9/2005 | Kline |
| 2005/0232344 A1 | 10/2005 | Mollenkopf |
| 2005/0286509 A1 | 12/2005 | Iwamura |

OTHER PUBLICATIONS

U.S. Appl. No. 11/062,647, filed Feb. 22, 2005, Iwamura.

* cited by examiner

PLC BREAKER BRIDGE

CROSS REFERENCE TO RELATED DOCUMENTS

This application is a continuation-in-part of U.S. patent application Ser. No. 11/297,528 filed Dec. 8, 2005 which claims priority benefit of U.S. Provisional Patent Application No. 60/645,900 filed Jan. 21, 2005, both of which are hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Home power lines usually use a single-phase three-wire system having first and second "hot" lines L1, L2 and a neutral that sends power to each home from a distribution transformer. Usually, several homes share one distribution transformer. Power lines L1 and L2 are normally coupled together (and usually coupled to neighbors) via the distribution transformer. Power line communication (PLC) networks utilize the existing power lines in order to facilitate computer networking (or networking of other appliances such as audio/video equipment). In one example, networks using the HomePlug® standard are used for achieving PLC communication. Since such networks interconnect devices using existing power outlets, information traveling over the power line may be accessible by neighbors or others tapping into the power line outside the home. If filtering is installed to prevent data from traveling outside the home, the two lines L1 and L2 may be isolated from each other.

In the case of global communication between lines L1 and L2, the signal may travel a long distance and get attenuated. Although attenuation in global communication is often negligible, sometimes it is not and thus it requires high transmission power, which would cause interference to other electronic products. This basic problem is addressed in U.S. patent application Ser. No. 11/297,528, the parent of the present application.

Powerline Communication (PLC) is expected to be used as a backbone of home networking. As of this writing, the second generation PLC standard is under discussion and will soon be finalized. The second generation PLC under discussion is a 200 Mbps class network. The actual payload rate, however, is 50 to 60 Mbps. This second generation is being proposed to simultaneously carry a few of MPEG-HD streams. Although the second generation PLC meets the present bandwidth requirements, bandwidth needs are likely to be ever increasing and more bandwidth will be required when HDTV streaming becomes common.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
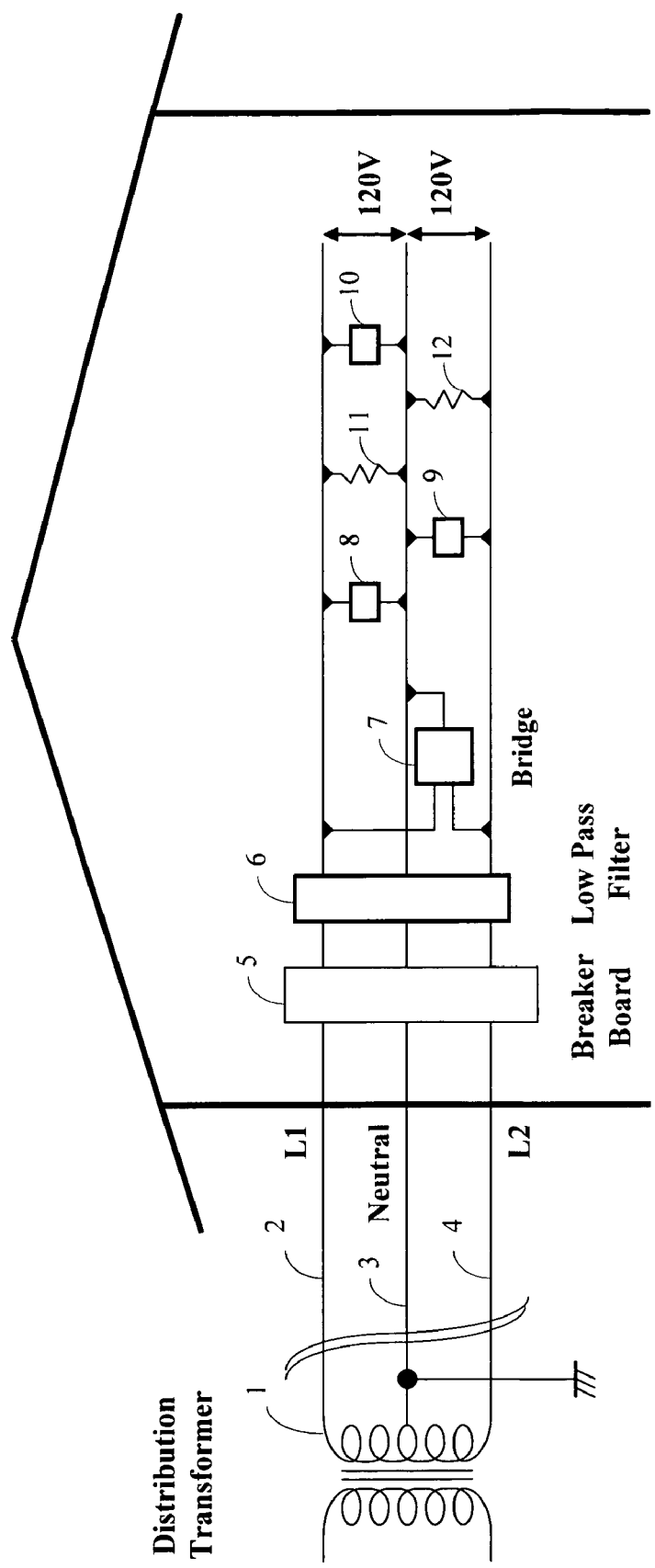
FIG. 1 is a diagram of a power line network consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Powerline Network Bridge

As described in application Ser. No. 11/297,528, the parent of the present application, home power line usually uses a single-phase three-wire system. Referring to FIG. 1, L1, L2 and neutral (elements 2, 4 and 3 respectively) send power to each home from the distribution transformer 1. For purposes of this document, each instance of L1 is considered a 120VAC circuit and each instance of L2 is considered a 120VAC circuit, or simply "circuit"; and a 240VAC circuit is obtained across L1 and L2. Usually, several homes share distribution transformer 1. Components 8 to 10 are powerline network devices, for example, a server or a client. Components 11 and 12 are a load, for example, a room heater or a lamp. When device 8 transmits data to device 10, the data are sent through L1, and the communication is readily accomplished since it is a local communication using the same power line L1. However, when device 8 transmits data to device 9, the data arrives at its destination by way of the distribution transformer 1 (L1→L2) (and in some instances, via cross-talk in breaker board 5 or through appliances representing a 240 volt load from L1 to L2. This is referred to as a global (or cross-phase) communication. In this case, the signal may travel a long way and get attenuated. Attenuation is not generally negligible and the maximum transmission power is limited by the FCC rules. In many instances, global communication accounts for 70-80% of local (in-phase) communication bandwidth. Another issue is that L1 and L2 have to share the time or frequency bandwidth even though they are separate. That is for example, device 9 on L2 cannot use the powerline network while device 8 and 10 carry out local communication on L1. This is not bandwidth efficient. Certain embodiments consistent with the present invention can be utilized to solve these problems and others.

In accordance with certain embodiments consistent with the present invention, a low pass filter 6 and a bridge device 7 are the utilized. The low pass filter (blocking filter) 6 passes, for example, signals having frequency content below 100 kHz. Since powerline networks generally utilize signals of higher frequency than 100 kHz, those signals are blocked from passing outside the low-pass filter toward the breaker board 5 and the distribution transformer 1. Such filter 6 should be designed block all powerline signals, so that no signal goes outside of the home. In addition to enhancing security, this further serves to minimize radiation of signals that can cause interference with other electronic devices. In addition, the filter 6 prevents unwanted signals from entering the home, thereby preventing neighboring networks from producing interference with the network shown in FIG. 1. With filter 6, the in-home powerline is completely isolated from the outside. Suitable blocking filters are commercially available in the market, for example, from Power Plus Co., LTD, of Dublin, Ireland.

Bridge device 7 is provided in order to isolate L1 from L2. When the bridge 7 receives a local stream, for example, from device 8 to 10 on L1, the bridge does not forward the stream to L2. The bridge only sends data to the other power line when it receives a global stream from L1 (or L2) to L2 (or L1). The bridge 7 internally has a device table and knows what device is on L1 or L2. Based on the device table, the bridge 7 determines to send or not to send to the other power line. Because L1 and L2 are isolated from each other, the total network bandwidth may theoretically approach twice that of a network without the bridge arrangement disclosed herein. In practical cases, it is anticipated that at least a 40-50% improvement can be achieved. (No global stream is the best case. The full bandwidth of L1 and L2 can be available in each network respectively.)

Figure 2:
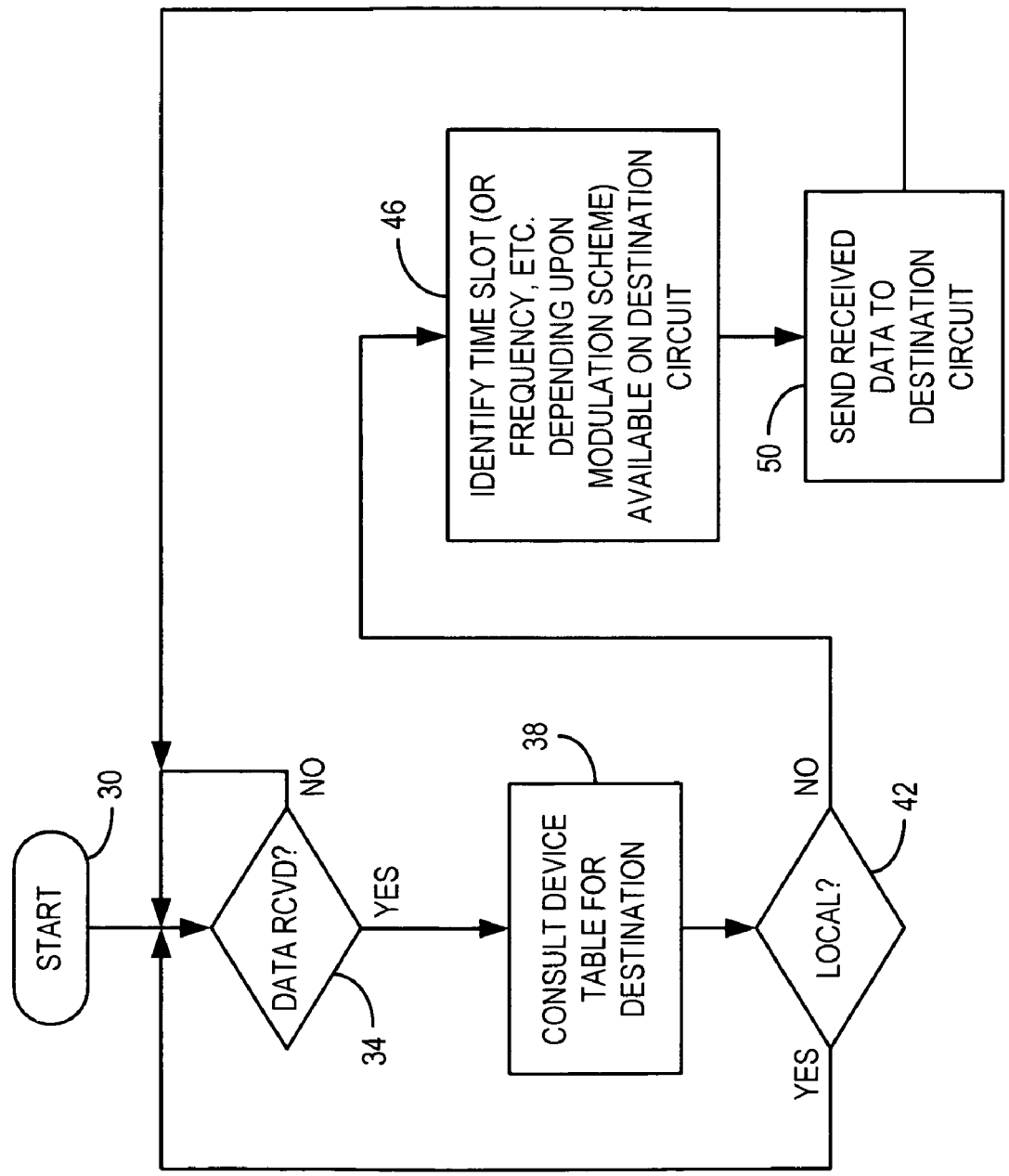
FIG. 2 is a flow chart depicting bridge operation consistent with certain embodiments of the present invention.

An example of bridge 7 is depicted in block diagram form in FIG. 6, and will be discussed later. The operation of bridge 7 is described in connection with FIG. 2 starting at 30 after which the bridge 7 determines if data have been received. If not, the bridge 7 awaits receipt of data. If data are received at 34, the bridge consults the device table for the destination at 38. If the destination is local, at 42, no action is taken and the process returns to 34. If, however, the destination is not in the same circuit as the source (not local, but cross-phase communication), the bridge 7 identifies a time slot (or carrier frequency or other parameter depending upon the modulation scheme) at 46 available on the destination circuit in order to be able to transmit the received data to the destination circuit at 50.

Figure 3:
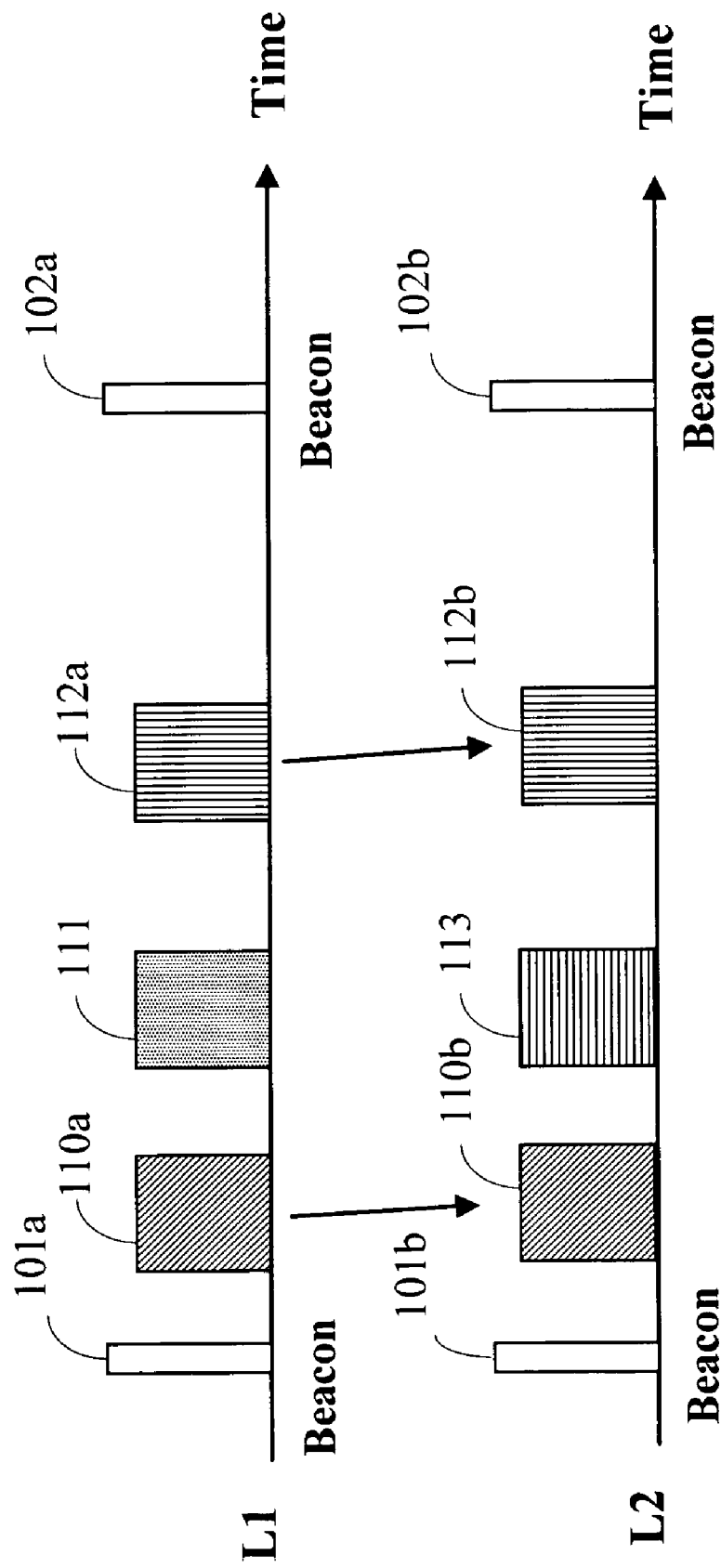
FIG. 3 is a timing chart of an exemplary scheme for master bridge access management in a manner consistent with certain embodiments of the present invention.

Referring now to FIG. 3, a timing diagram is used to illustrate the isolation between circuits using the present bridge arrangement. In this illustration, a separate set of beacons 101*a* and 102*a* are used for the circuit of L1, while beacons 101*b* and 102*b* are used in circuit L2. Data shown at 110*a* are transferred as cross-phase communication to L2 at 110*b* in an available time slot. Similarly, data at 112*a* are transferred to 112*b* in an available time slot. (The illustrated beacons may be synchronized to AC line cycle, usually 50 or 60 Hz, or handled in another manner as will be described later.) Local communication traffic represented by 111 and 113 remain isolated as do the beacons. In this illustration, the beacons are approximately synchronized, but this should not be considered limiting since they may be totally independent as will be described later. This timing diagram will be discussed in greater detail later.

Office powerline distribution and distribution in large homes and other installations serviced by multiple distribution transformers is more complicated than that used in most homes. In such environments, physically close outlets are not always on the same power line circuit, instead, they may be supplied via other distribution transformers. Hence, no power line networking is generally available between such outlets.

Figure 4:
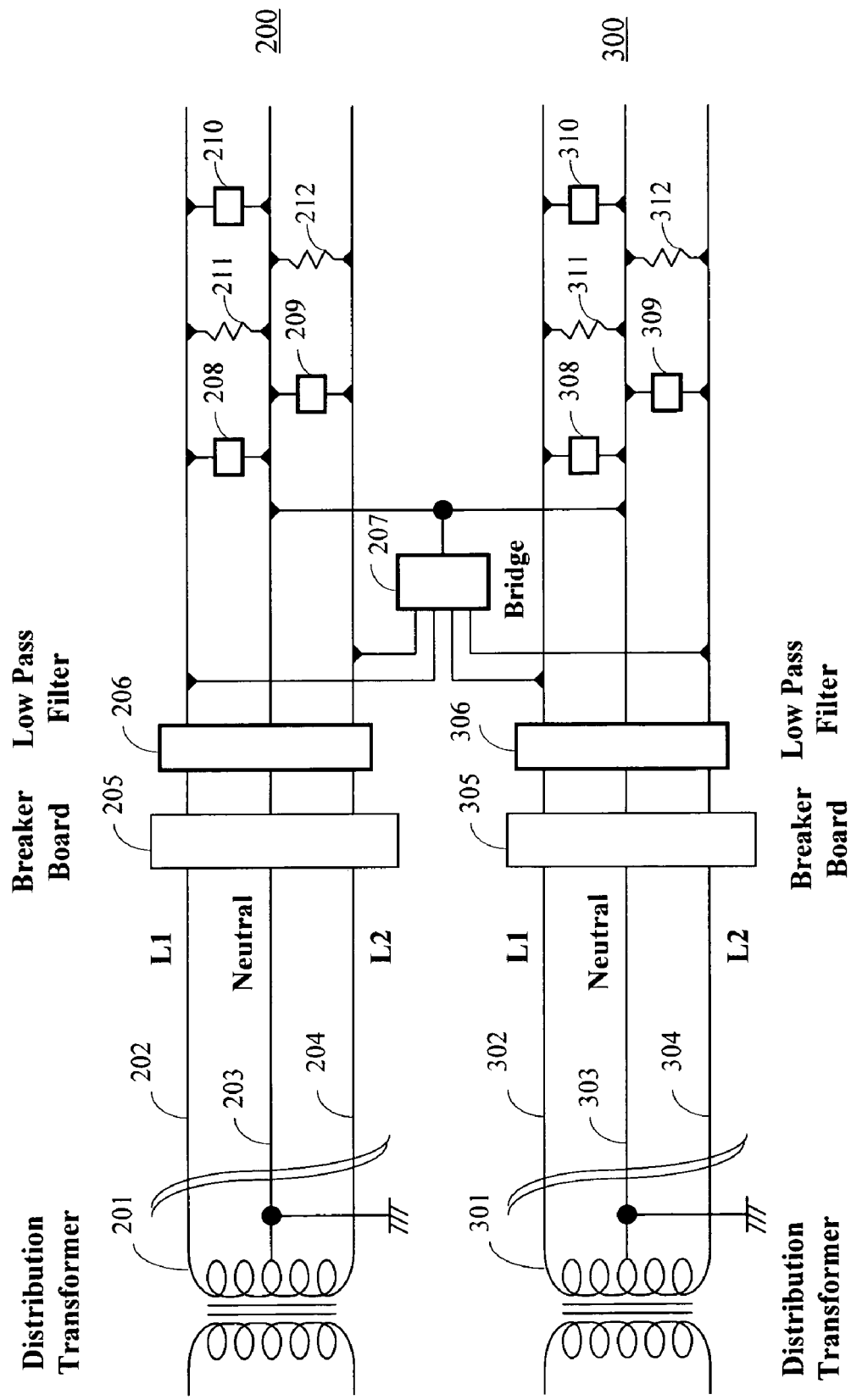
FIG. 4 is a diagram of a power line network consistent with certain embodiments of the present invention.

A bridge arrangement consistent with certain embodiments can be used to link independent power lines. FIG. 4 shows an example of such an office powerline distribution (or other system in which multiple distribution transformers feed a single institution) in which a powerline network is desired. In this case, two distribution transformers are illustrated. Transformer 201 provides power lines 202 and 204 along with a neutral 203. The power passes through breaker board 205 and low pass filter 206 in the same manner as described in connection with FIG. 1. Components 208, 209 and 210 represent network nodes, while 211 and 212 represent other loads on the power line circuit. Transformer 301 provides power lines 302 and 304 along with a neutral 303. The power passes through breaker board 305 and low pass filter 306 in the same manner as described in connection with FIG. 1.

Components 308, 309 and 310 represent network nodes, while 311 and 312 represent other loads on the power line circuit. Bridge 207 links the two sets of the power lines. The bridge 207 forwards only global communications between two or more power lines. Bandwidth of each power line can thereby be used efficiently. While this can be accomplished using a wired connection as will be described in connection with FIG. 6, wireless communication can also be utilized to effect a portion of the bridging function.

Thus, a power line communication (PLC) bridge circuit consistent with certain embodiments has a first coupler that couples data signals to and from the first power line circuit and a second coupler that couples data signals to and from the second power line circuit. The first and second power line circuits are fed AC power from first and second distribution transformers. A first communication transceiver is connected to the first coupler for transferring data signals to and from the first coupler. A second communication transceiver is connected to the second coupler for transferring data signals to and from the second coupler. A controller examines data signals from the first transceiver and determines if the data is destined for the second transceiver, wherein data that is not destined for the second transceiver is considered local data. The controller further examines data signals from the second transceiver and determines if the data is destined for the first transceiver, wherein data that is not destined for the first transceiver is also considered local data. A bridge circuit passes data signals between the first communication transceiver and the second transceiver when the controller determines that the data is not local, and for not passing data signals between the first communication transceiver and the second communication transceiver when the controller determines that the data is local.

In certain embodiments, a power line communication (PLC) bridging method involves receiving data from a first power line circuit and a second power line circuit, wherein the first and second power line circuits are fed AC power from separate legs of a distribution transformer, and share a single neutral connection; examining data signals from the first power line circuit to determine if the data is destined for the second power line circuit, wherein data that is not destined for the second power line circuit is considered local data; examining data signals from the second power line circuit to determine if the data is destined for the first power line circuit, wherein data that is not destined for the first power line circuit is considered local data; passing data signals between the first power line circuit and the second power line circuit when the data is determined to not be local; and not passing data signals between the first power line circuit and the second power line circuit when the controller determines that the data is local.

Figure 5:
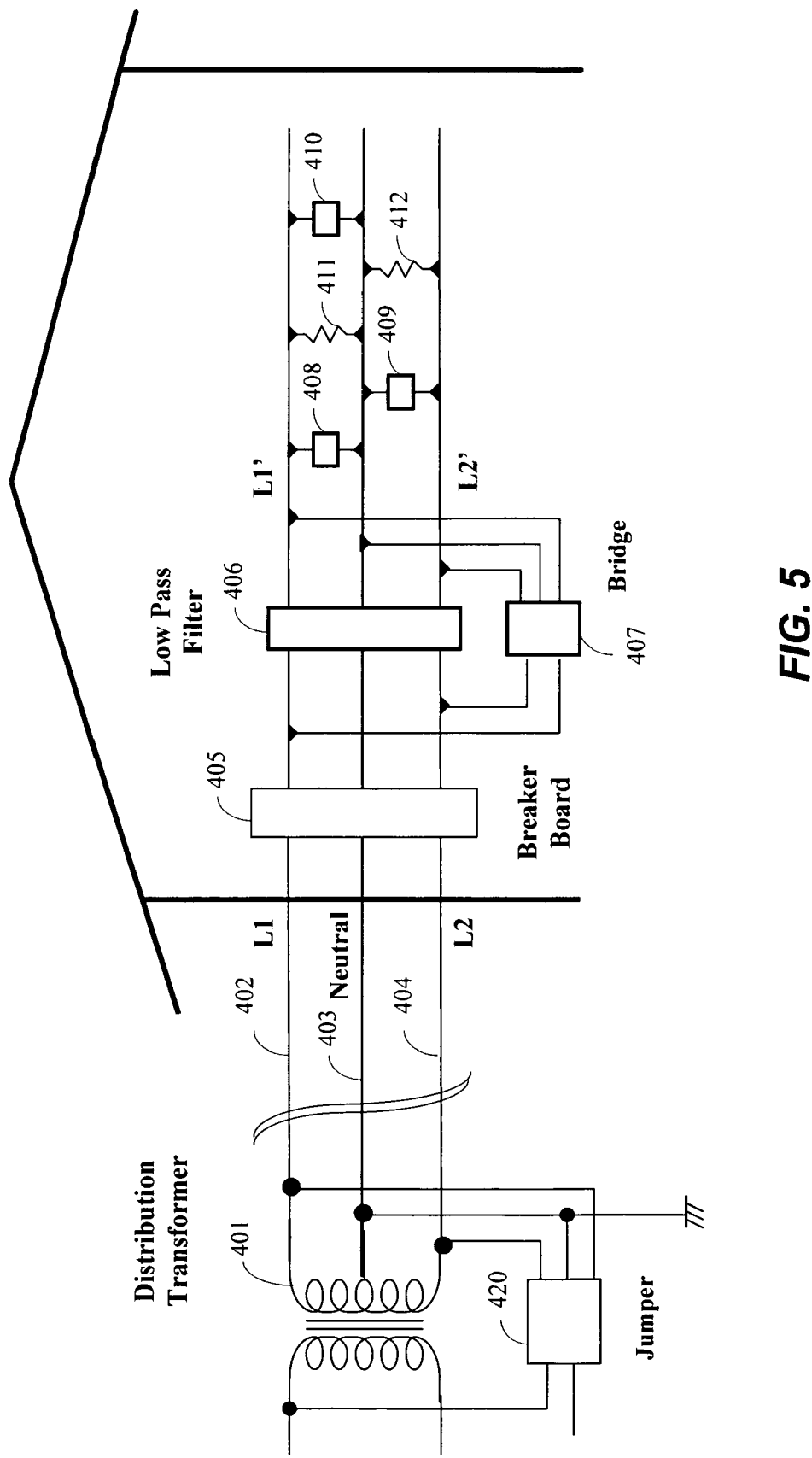
FIG. 5 is a diagram of an access power line network consistent with certain embodiments of the present invention.

Referring now to FIG. 5, some companies plan to provide Internet access service using power lines as the communication medium. This is depicted in this figure wherein Transformer 401 provides power lines 402 and 404 along with a neutral 403. The power passes through breaker board 405 and low pass filter 406 in the same manner as described in connection with FIG. 1. Components 408, 409 and 410 represent network nodes, while 411 and 412 represent other loads on the power line circuit. In this embodiment, bridge 407 links the two sets of the power lines and forwards global communications between the two (or more) power lines, and further passes communications bound to or from the Internet around filter 406 to facilitate Internet access.

In this case, the distribution transformer 401 passes no powerline signal. Jumper 420 is installed to the transformer to jump it and permit communication of Internet traffic. The bridge 407 links not only the internal power lines L1' and L2', but also the incoming power lines L1 and L2. The bridge 407 connects L1 (L2) to L1' or L2' on request. In this application, the bridge 407 may have more intelligence, for example, router capability. The router can also act in the capacity of a firewall to protect the in-home powerline network from various attacks from the outside.

Figure 6:
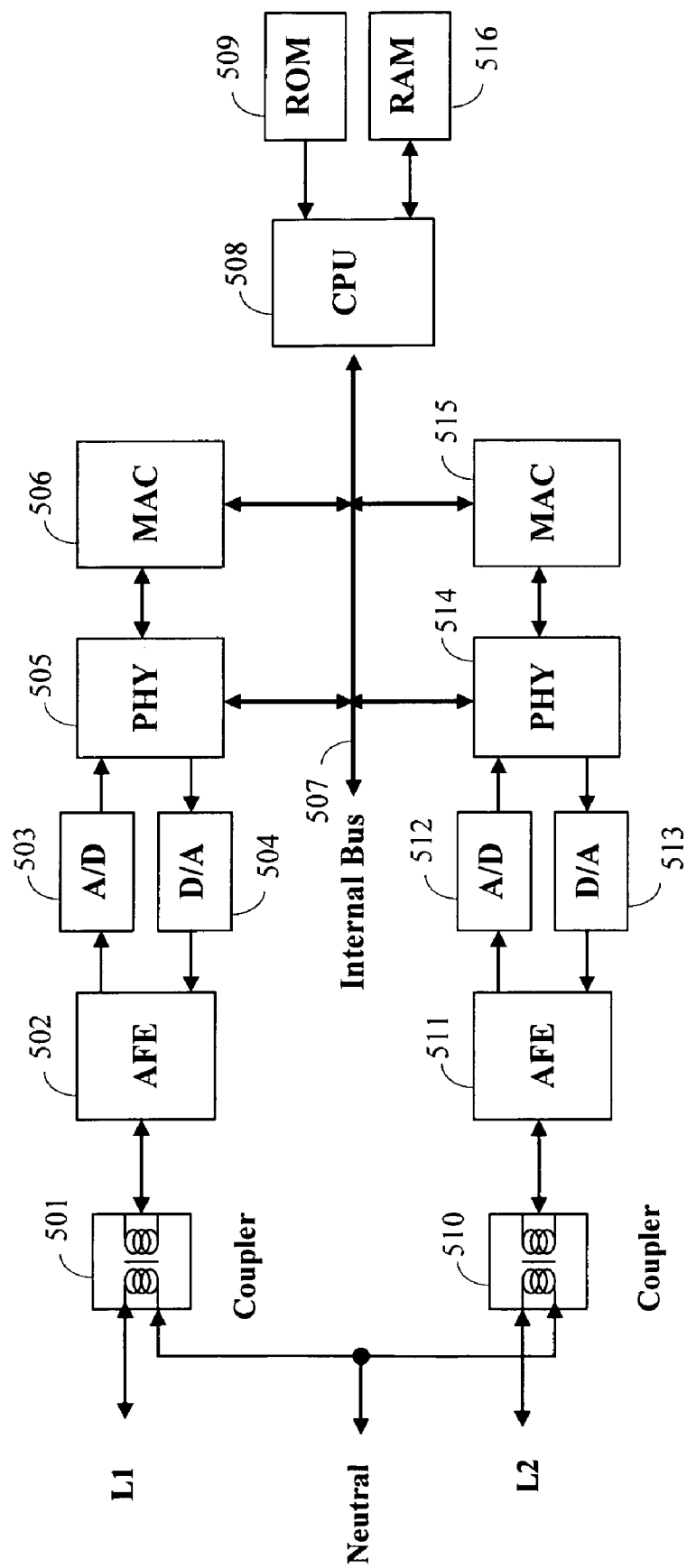
FIG. 6 is a block diagram of a powerline bridge consistent with certain embodiments of the present invention.

FIG. 6 illustrates an example block diagram of the bridge 7. Those skilled in the art will understand how to suitably modify this circuit to accommodate more circuits (as in FIG. 4 or FIG. 5). This example embodiment assumes as PLC network such as those conforming to the HomePlug® standard, or similar, but this should not be considered limiting since one of ordinary skill can adapt the present principles to other power line network arrangements. A signal from L1 is sent to Analog Frontend (AFE) 502 through Coupler 501. Coupler 501 shuts out the 120 VAC line voltage and only passes powerline network communication signals. The output of AFE 502 is analog-to-digital converted in A/D 503. The result is processed in the physical layer block 505 and in Media Access Control layer block 506.

When a signal is sent to L1, the signal is processed in the reverse direction. The signal is processed in MAC 506 and in PHY 505. The result is digital-to-analog converted in D/A 504 and sent to AFE 502 and Coupler 501. Components 510, 511, 512, 513, 514 and 515 work for L2 signals in a manner similar to that of components 501 to 506. CPU 508 controls the PHY and MAC blocks (505, 506, 514 and 515) through the internal bus 507. The internal bus 507 may be, for example, a PCI bus. CPU 508 executes the software program stored in the read only memory 509. CPU 508 uses the random access memory 516 for temporary storage. The process depicted in FIG. 2 can be stored in ROM 509 or other computer readable storage medium and is carried out by execution of instructions on CPU 508.

When the data needs to be forwarded from L1 to L2, the output of MAC 506 is sent to MAC 515 through the internal bus 507. If data buffering is required to facilitate correction of timing issues as described later, CPU 508 temporarily stores the data in RAM 516. Alternatively, the internal memory in MAC 506 or 515 (not shown) may store the data.

Usually, regardless of local/global communications, the transmission power is fixed by federal regulation (e.g., the FCC). During global communications, actual bandwidth would be reduced because of higher signal attenuation. The present PLC bridge prevents bandwidth reduction in most instances.

For purposes of this discussion, elements 502, 503, 504, 505, 506, 507, 508, 509 and 516 operate together to constitute a data transceiver that sends and receives data, via coupler 501, to and from power line circuit L1. Similarly, elements 511, 512, 513, 514, 515, 507, 508, 509 and 516 operate together to constitute a data transceiver that sends and receives data, via coupler 510, to and from power line circuit L2. Internal bus 507, along with processor (CPU) 508, utilizing ROM 509 and RAM 516 are shared between the two transceivers, with data passing between the two transceivers using internal bus 507, operating under program control with the program running on CPU 508. Hence, CPU 508 serves in the capacity of a controller for the two (or more) transceivers.

Thus, a power line communication (PLC) bridge circuit consistent with certain embodiments has a first coupler that couples data signals to and from the first power line circuit and a second coupler that couples data signals to and from the second power line circuit. The first and second power line circuits are fed AC power from separate legs of a distribution transformer, and share a single neutral connection (or else, are fed from multiple separate distribution transformers). A first communication transceiver is connected to the first coupler for transferring data signals to and from the first coupler. A second communication transceiver is connected to the second coupler for transferring data signals to and from the second coupler. A controller examines data signals from the first transceiver and determines if the data is destined for the second transceiver, wherein data that is not destined for the second transceiver is considered local data. The controller further examines data signals from the second transceiver and determines if the data is destined for the first transceiver, wherein data that is not destined for the first transceiver is also considered local data. A bridge circuit passes data signals between the first communication transceiver and the second transceiver when the controller determines that the data is not local, and does not pass data signals between the first communication transceiver and the second communication transceiver when the controller determines that the data is local.

As described above, the bridge may control more than two power lines. In this case, a set of components 501 to 506 is implemented for each power line. CPU 508 controls multiple streams through the internal bus 507. The internal bus 507 should be designed to have enough bandwidth to handle the maximum number of streams contemplated for the particular application.

Figure 7:
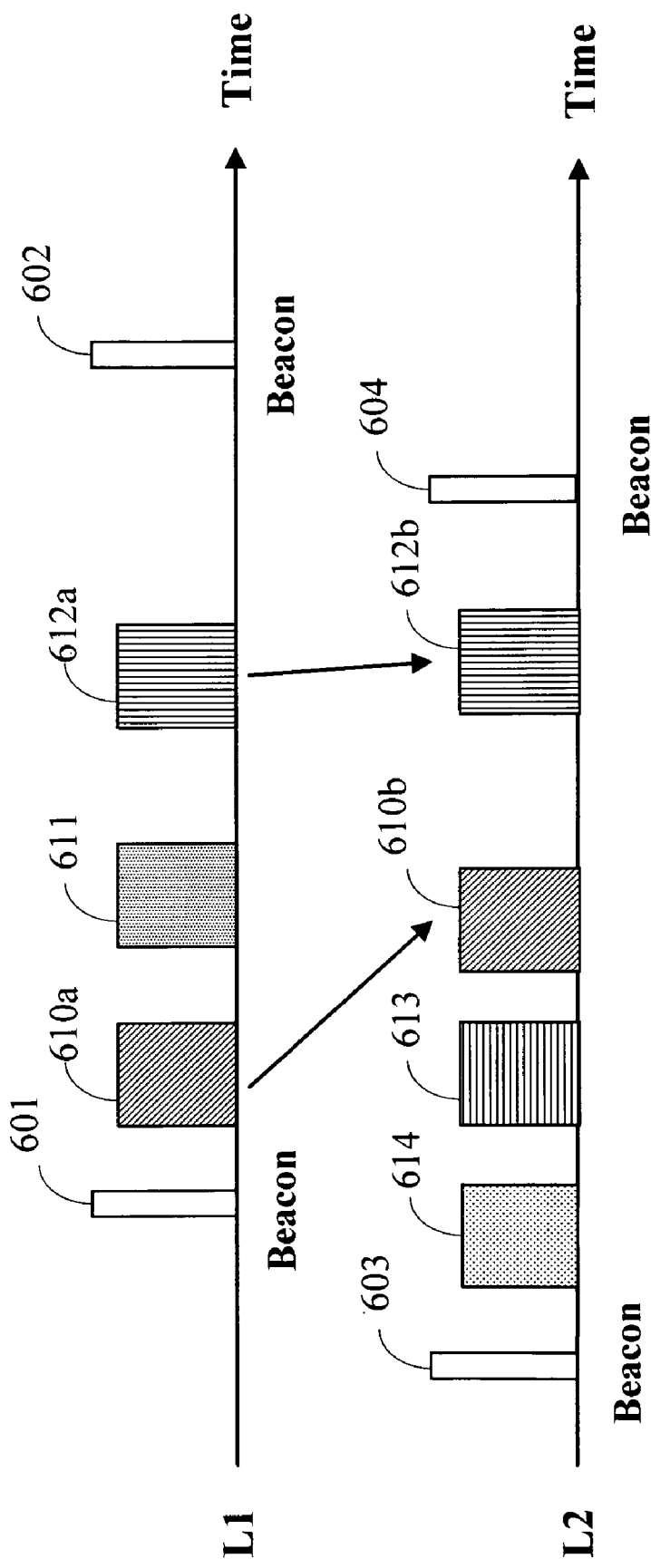
FIG. 7 is a timing chart of an exemplary scheme for access management in a manner consistent with certain embodiments of the present invention.

In order to facilitate access control, usually, a master exists on the powerline network. The master receives an access request from a client (slave) and gives an access time (or frequency) slot to the client. Then, the client starts transmission. The master broadcasts a beacon periodically. All transmissions are performed based on the beacon cycle. If contention-free transmission is required, the same access slot in each beacon cycle is reserved for the transmission. In the case of access with contention, an access slot is obtained on first-come-first-serve basis, or by use of other arbitration protocol. Assume that each of L1 and L2 has its own master. FIG. 7 illustrates access slot management by the bridge 7 (referring back to FIG. 1). The L1 master sends beacon signals 601 and 602. The L2 master sends beacons 603 and 604. L1 and L2 beacons are not synchronized in this illustration. Slot 611 is used for local transmission on L1. Similarly, slots 613 and 614 are used for local transmission on L2. Slot 612a is a global transmission from an L1 device to an L2 device. The bridge 7 assigns the same slot 612b on L2 to send the data to the final destination (L2 device). There is a little time delay between 612a and 612b to forward the data in the bridge 7. The same slot is not always available on L2. An L1 transmitter sends data using the slot 610a. Unfortunately, the same time slot 613 on L2 is already occupied by another local transmission. In this case, the bridge 7 finds another slot 610b and forwards the data to the destination on L2. These actions correspond to the process depicted in block 46 of FIG. 2.

The bridge 7 may have master capability. In this case, no other master exists either on L1 or on L2. All devices send an access request to the bridge 7. FIG. 3 illustrates access slot management in this case. The bridge periodically sends beacons (101 and 102) to both L1 and L2. The slots 110 and 112 are for global transmission. The slots 111 and 113 are for local transmission. The bridge 7 can assign access slots so that global and local transmissions do not conflict with each other. Thus, certain advantages may be obtained in the instance that the bridge 7 has network master capability. In this example embodiment, the CPU, operating under program control, can operate to configure the bridge 7 as a master. In this case, the CPU serves as a beacon generator that generates beacon signals transmitted over the first and second power line circuits.

There may be an interference issue caused by the same frequencies on L1 and L2, however, there are solutions for this problem. One is transmission power control. In this case, each device has automatic gain control capability in AFE 502. The transmitter can minimize (optimize) transmission power level. This will reduce interference to the other power line. Another solution is to avoid troublesome frequencies that cause interference. OFDM (Orthogonal Frequency Division Multiplex) may be utilized in PLC systems. OFDM uses more than 100 sub-carriers. Some sub-carriers may cause substantial interference and some will not. It mainly depends on the powerline layout. The transmitter and the receiver often exchange a tone map. The tone map indicates which sub-carriers can be used based on the result of signal-to-noise ratio (SNR) measurement. Based on the tone map, the transmitter selects sub-carriers and modulation schemes. A poor SNR sub-carrier is eliminated or a robust modulation (ex. Binary Phase Shift Keying) is used for the sub-carrier. This tone map mechanism avoids troublesome sub-carriers.

Figure 8:
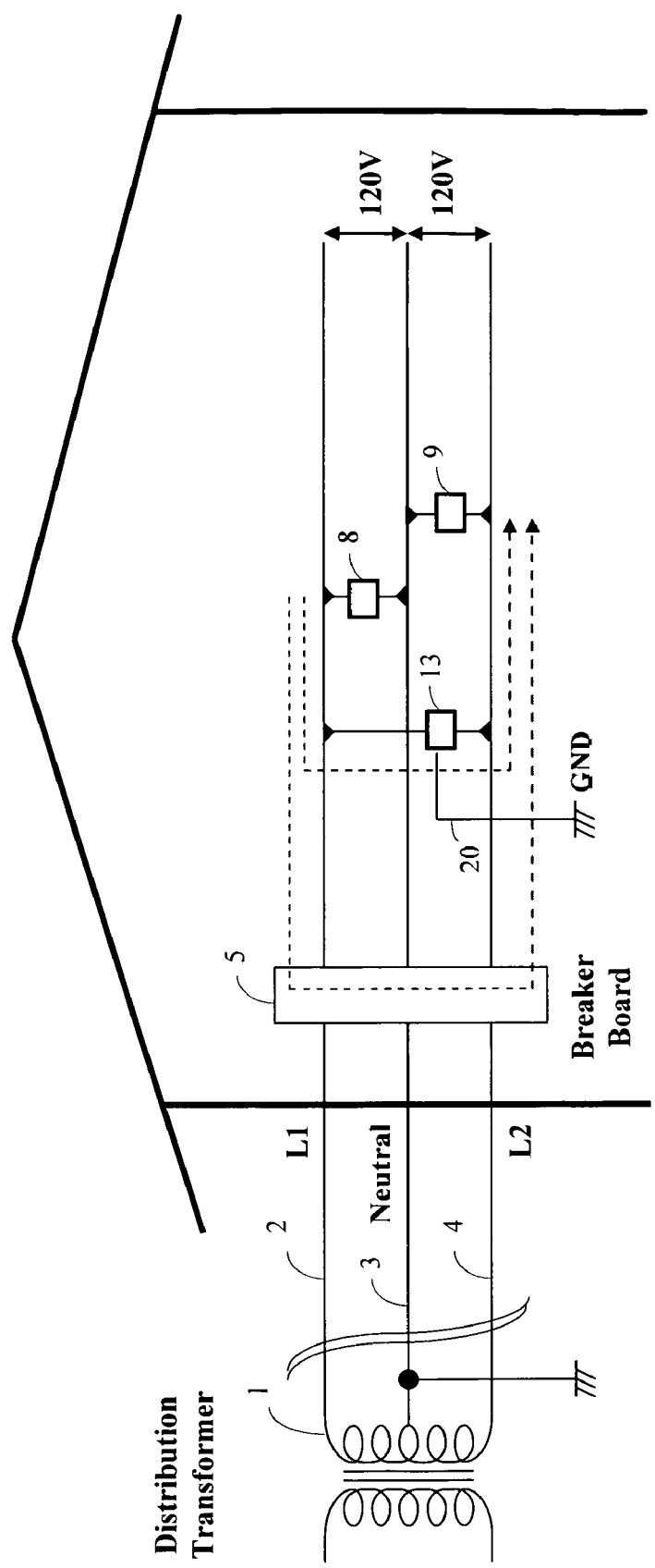
FIG. 8 is a diagram illustrating potential cross-phase paths between L1 and L2.

Referring now to FIG. 8, it is noted by the dashed arrows that there are two additional paths (besides the distribution transformer) that a cross-phase signal can take in order to pass from line L1 to L2 (and vice versa). Coupling can occur at the breaker board 5 as previously discussed. In addition, a 240-volt appliance 13 may pass the signal from line L1 to L2. The third path is by way of the distribution transformer 1, but usually the transformer 1 is far and signal attenuation may be much greater than the other paths. The 240-volt appliance, for example, a laundry dryer is plugged into both L1 and L2. In order to minimize interference between the two circuits L1 and L2, it is desirable to block both all paths from L1 to L2 at the frequencies of interest in the PLC network.

Figure 9:
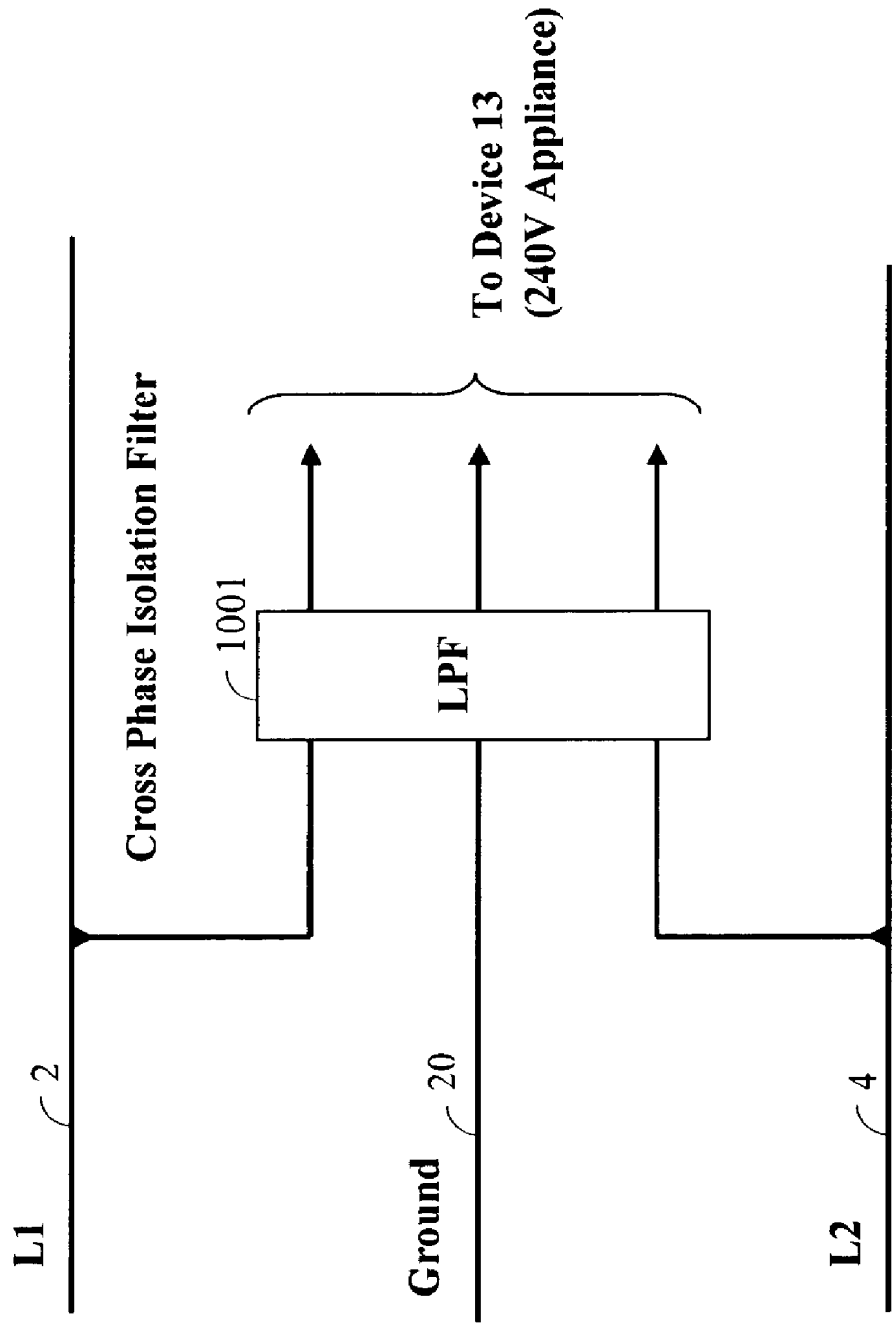
FIG. 9 is a block diagram of a cross-phase isolation filter consistent with certain embodiments of the present invention.

As shown in FIG. 1, the paths provided by the distribution transformer and the breaker board are blocked by the low pass filter 6. The 240VAC appliance path can be blocked by the low pass filter 1001 shown in FIG. 9. The Filter 1001 can be realized as, for example, AC plug adapter which is inserted between the power lines and the 240VAC appliance 13. The filter 1001 is designed to block all PLC signals and isolate L1 and L2. Since the 240VAC signal is at a very low frequency (60 Hz in the U.S.) and the PLC signals are generally at a far greater frequency (e.g., 1 to 30 MHz range), the design of an appropriate filter is readily within the realm of conventional analog filter design, and the details of an exemplary filter circuit design need not be provided. Other embodiments will occur to those skilled in the art upon consideration of the present teachings.

Figure 10:
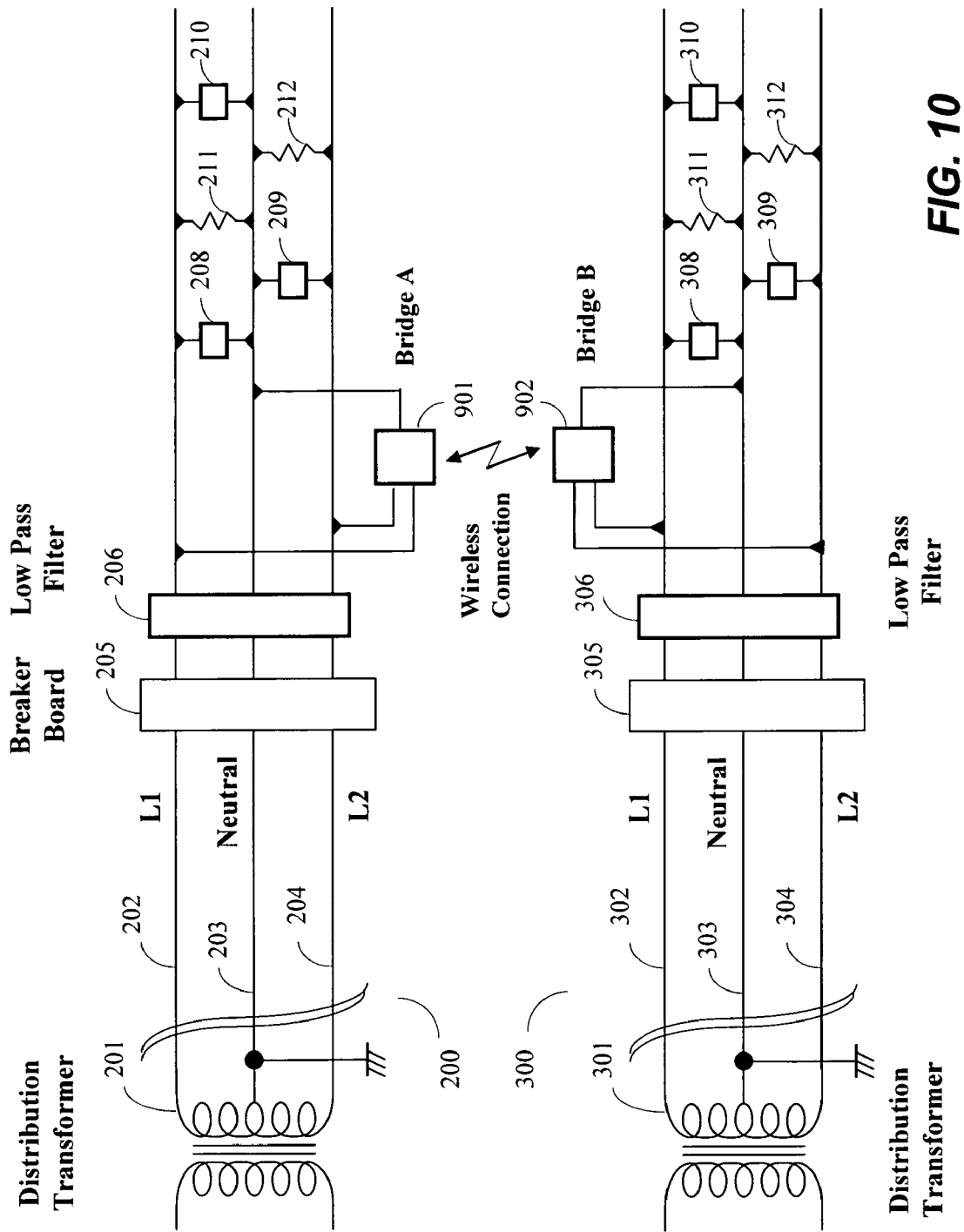
FIG. 10 depicts a wireless bridge arrangement consistent with certain embodiments of the present invention.

As previously mentioned briefly, bridging between two sets of power lines supplied from separate distribution transformers may be accomplished using wireless technology. FIG. 10 depicts a wireless variation of the bridge system shown in FIG. 4 used to accomplish a similar function. Bridge A 901 and Bridge B 902 provide the wireless bridge function by performing wireless communications between the upper circuit 200 and the lower circuit 300. This application is particularly useful when the two powerline systems 200 and 300 are not so physically close so as to enable easy connection with a wired bridge.

Figure 11:
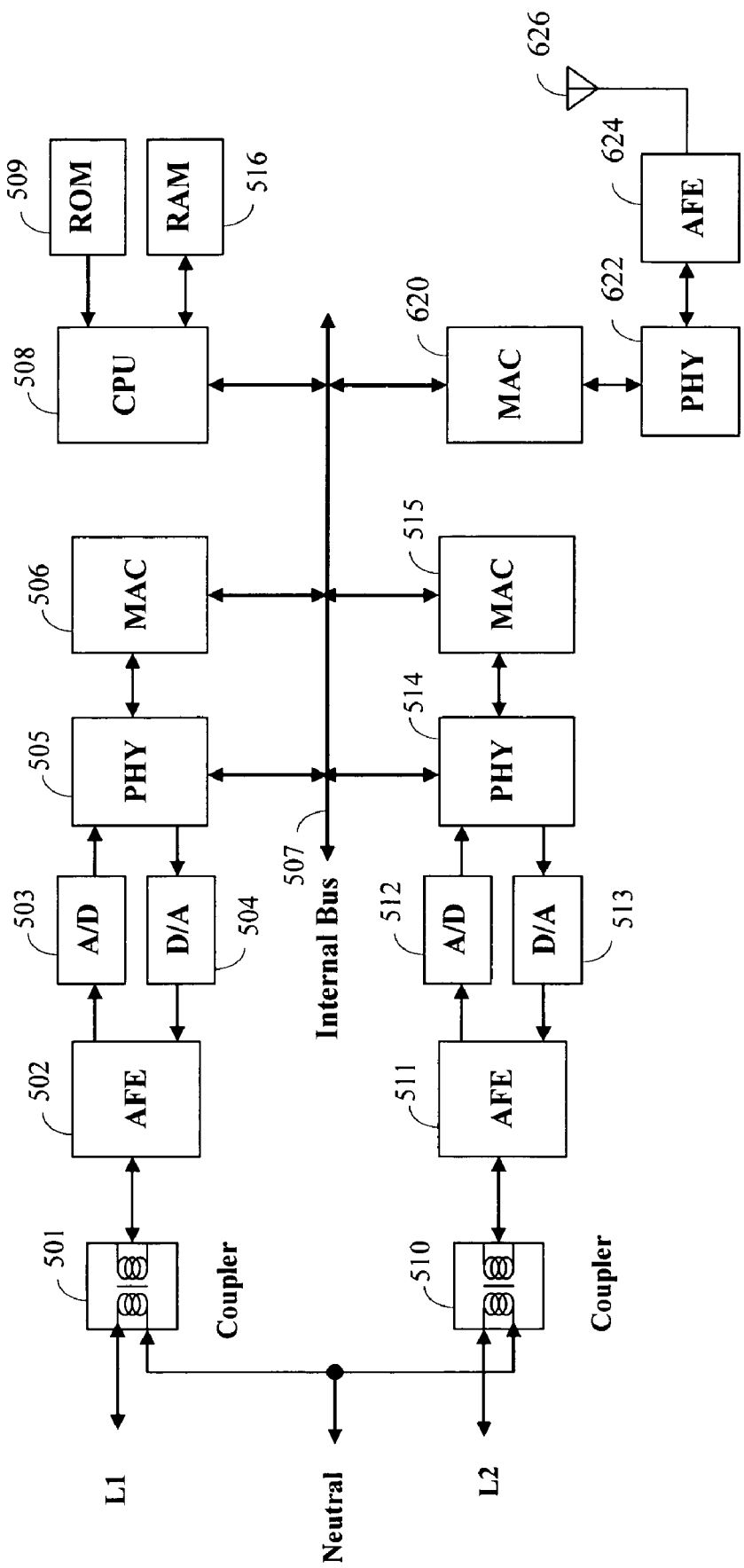
FIG. 11 is a block diagram of an exemplary wireless powerline bridge consistent with certain embodiments of the present invention.

FIG. 11 shows an exemplary block diagram of the bridge 901 or 902. Except for the wireless interfaces, this bridge operates much the same as that of FIG. 6. This embodiment adds MAC block 620, the physical layer block 622, the analog frontend (RF transceiver) block 624 and the antenna 626 to the original block diagram shown in FIG. 6. Communication between the two powerline systems 200 and 300 is carried out using the wireless interface as shown. The wireless communication can be carried out using, for example, an IEEE 802.11 wireless network. For example, the device 208 sends a stream to the device 309. The stream is sent to the bridge A 901. In the bridge A 901, the signal is processed from 501 to 506 and forwarded to the wireless block 620 to 626 for wireless communication. In the bridge B 902, the signal is received by the antenna 626, processed at the block 622 and 620 and forwarded to the block 515 to 510. Finally, the signal is sent to the device 309 on the L2 power line. Note that the L2 line of 200 and the L1 line of 300 are completely isolated from this communication, and thus, lose no bandwidth.

In accordance with certain embodiments consistent with the present invention, certain advantages may be achieved such as the following: L1 and L2 are isolated. Both buses will be used efficiently, up to twice bandwidth at best. The low pass filter isolates the in-home powerline from the outside. The full powerline bandwidth is available. The filter also reduces interference to the outside. No high transmission power required for a global communication. Bandwidth is not reduced for a global communication. Interference can be minimized. The bridge relays global communication. No serious attenuation occurs. The bridge may efficiently assign an access slot to each transmitter so that the global communication does not conflict with other local communications. The bridge can be used for access powerline communication. The bridge can be used to link two or more independent power lines. While these and other advantages may be achieved using embodiments consistent with the present invention, failure to meet any of these advantages does not imply that an embodiment falls outside the realm of other embodiments consistent with the present invention.

PLC Breaker Bridge

To expand PLC bandwidth, the power line bridge described above uses a cross-phase PLC bridge. The bridge isolates L1 and L2 and theoretically expands the bandwidth up to 200% of that available without the bridge. This concept can be further extended to take even greater advantage of bandwidth re-use. In this extension of bandwidth re-use, a bridge installed in the sub-breaker module isolates each branch line and blocks local communications. In so doing, another branch line can re-use the same time and frequency allocations and thus further increase the bandwidth available in any branch of the power line.

Powerline communication (PLC) is expected to be used as a backbone of many home networking. At this writing, the second generation PLC standard is under discussion and will be soon finalized. The second generation PLC as proposed is a 200 Mbps class network having an actual payload rate of approximately 50 to 60 Mbps. This network is proposed to simultaneously carry several MPEG-HD streams. Although the second generation PLC meets present bandwidth requirements, more bandwidth will be required when HDTV streaming becomes common.

In accordance with certain embodiments consistent with the present invention a bridge is designed for installation in a sub-breaker module in order to isolate each branch line to block local communications while passing communication between branches. In this manner, multiple branch line can simultaneously use the same time and frequency allocations.

Figure 12:
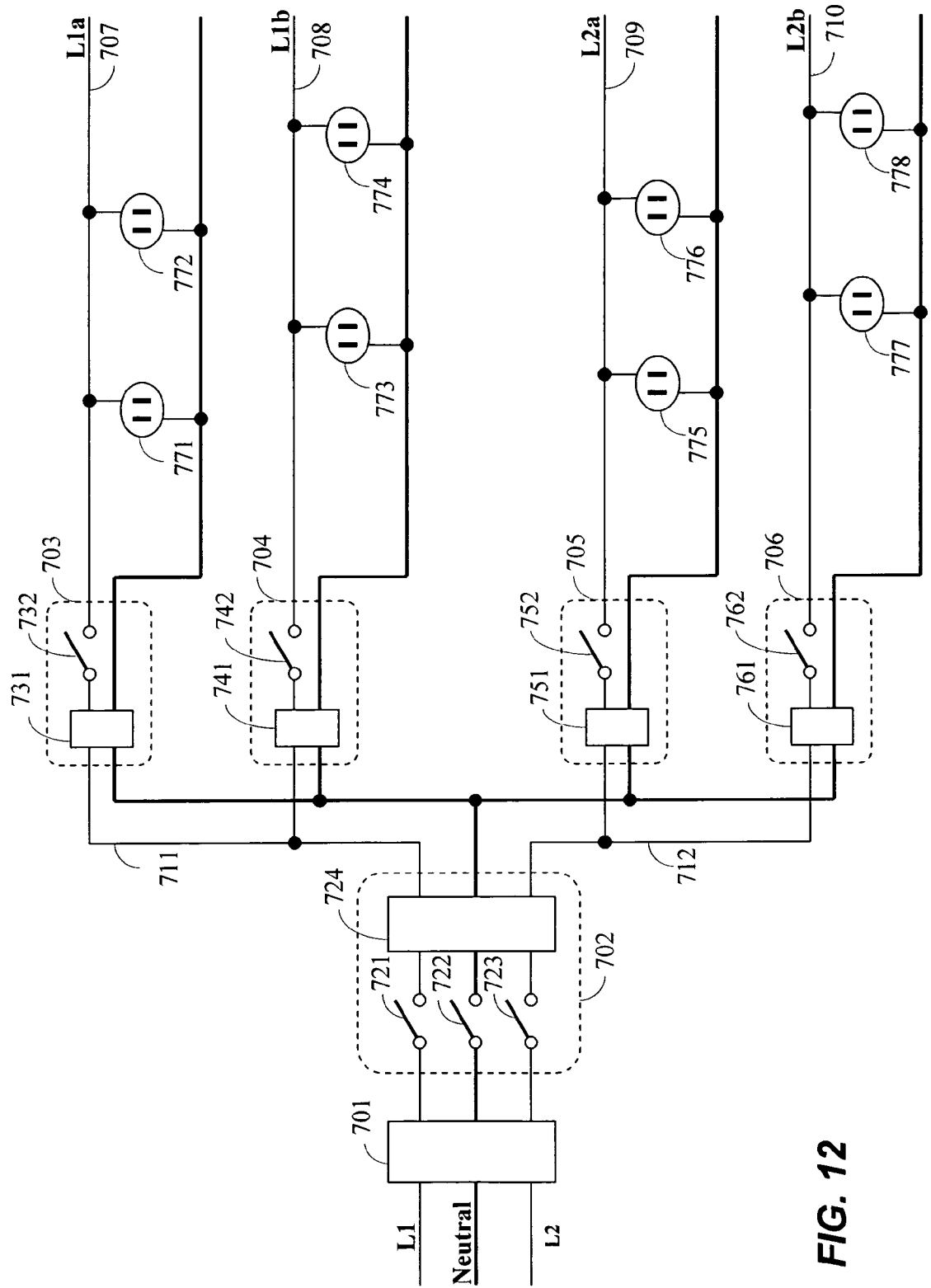
FIG. 12 illustrates exemplary powerline network consistent with certain embodiments.

FIG. 12 illustrates exemplary powerline network. This is a single-phase 3-line system. L1, L2 and the neutral line come from a distribution transformer (not shown in FIG. 12). These lines go to the circuit's main breaker module 702 through the watt-hour meter 701. The dashed box labeled 702 can represent a breaker module housing in accordance with certain embodiments consistent with the present invention. Breaker switch contacts 721, 722 and 723 are normally closed. Contacts 721, 722 and 723 are designed to open when electric current flowing to the home (or office, etc.) exceeds a threshold, for example 200 amps. The main PLC unit 724 isolates the internal power lines from the incoming lines. The main PLC unit 724 also couples the cross-phase lines (L1 and L2). The power lines 711 and 712 are split into several branches (in this example, four branches L1a, L1b, L2a and L2b) after the main breaker module 702.

Each branch line has a sub-breaker module shown as 703, 704, 705 and 706. The dashed boxes surrounding the sub-breaker modules 703, 704, 705 and 706 can be considered to represent a circuit breaker housing in accordance with certain embodiments. PLC Bridge 731 works as a network bridge, which isolates the branch line 707 (L1a) from the L1 line 711 and only passes necessary signals. The sub-breaker 732 is normally closed and will be open when electric current exceeds a threshold established for the wiring of circuit L1a, for example, 15 or 20 amps. The other sub-breaker module 704, 705 and 706 have the same internal components. AC outlets 771 and 772 are connected to the branch line 707 and serve both as sources of conventional AC power as well as connection points for PLC devices. A PLC device can be plugged into any or all of the outlets. Usually, the main breaker module 702 and the sub-breaker modules (703, 704, 705 and to 706) are placed in the breaker board (i.e., circuit breaker panel).

Sub-breaker modules 704, 705 and 706 similarly contain PLC bridges 741, 751 and 761, as well as sub-breakers 742, 752 and 762 respectively. Sub-breaker modules 704, 705 and 706 respectively supply branch lines 708, 709 and 710 respectively which are also shown as branch lines L1b, L2a and L2b respectively. Each of the branch lines can contain one or more AC outlets. One pair is depicted on each branch line as 773 and 774; 775 and 776; and 777 and 778.

Figure 13:
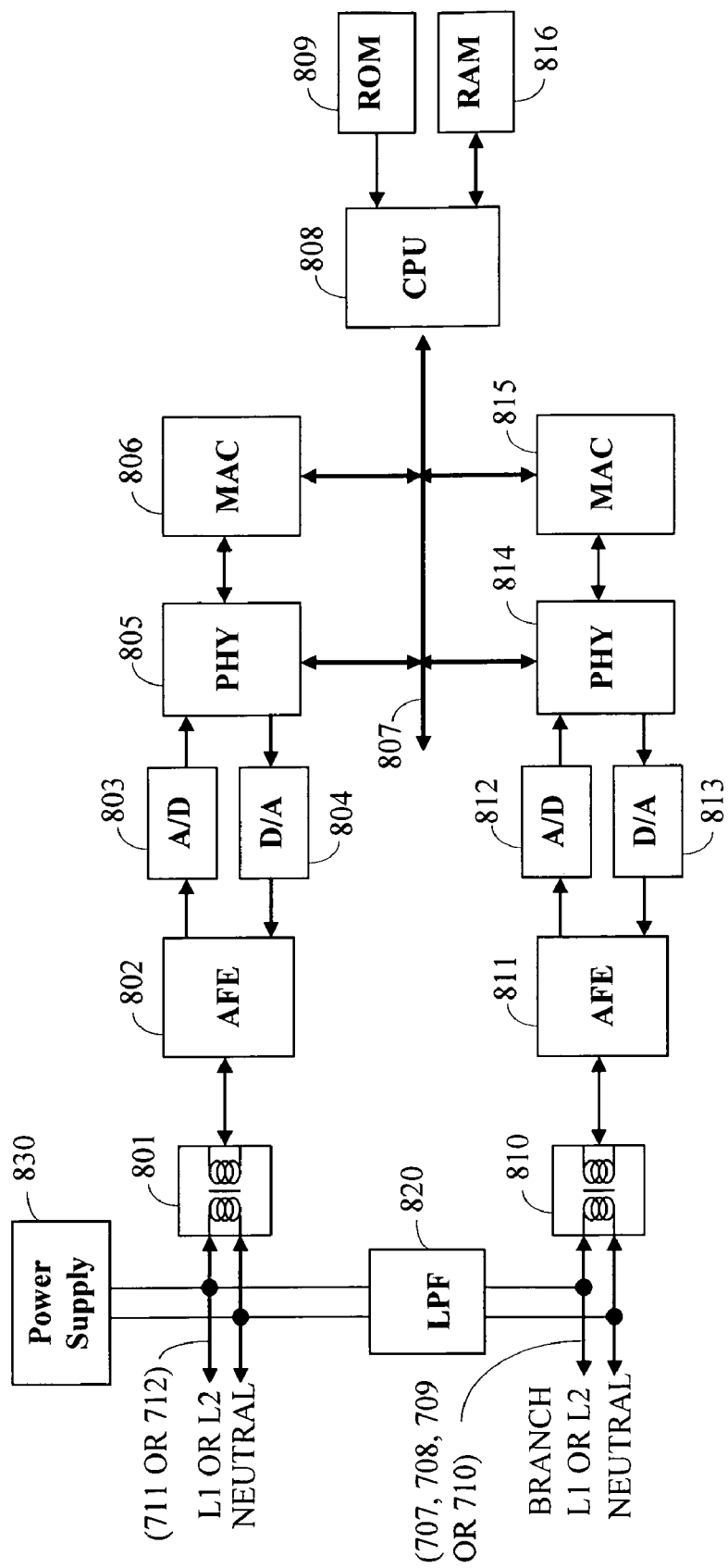
FIG. 13 shows a block diagram of the internal components of an exemplary PLC Bridge consistent with certain embodiments.

FIG. 13 shows a block diagram of the internal components of the PLC Bridge such as 731 (or 741, 751 or 761). The low pass filter 820 passes only electric power (e.g., 120 Volt household current in the U.S.) and blocks PLC signals. Bridge 731 isolates the main lines (711 or 712) and the branch lines (707, 708, 709 or 710) by use of a pair of transceivers (e.g., OFDM transceivers, HomePlug® compliant transceivers) that are isolated from each other by low pass filter 820, with signals passing to and from a branch from and to the main circuit at the MAC layer under control of processor 808. A signal from the main line (L1 or L2) is sent to Analog Front End (AFE) 802 through Coupler 801. Coupler 801 blocks 120 volt AC signals and only passes powerline network signals. The output of AFE 802 is analog-to-digital converted in A/D 803 which converts analog signals to digital. The resulting output of 803 is processed in the physical layer block 805 and in Media Access Control layer block 806. When a signal is sent to the main line, the signal is processed in the reverse direction. The signal is processed in MAC 806 and in physical layer block 805. The result is digital-to-analog converted in D/A 804 and sent to AFE 802 and Coupler 801. Components 810 to 815 operate in the same manner as 801 to 806 for the local signals appearing on the branch circuits. Processor (CPU) 808 controls the physical and MAC layer blocks (805, 806, 814 and 815) through the internal bus 807. The internal bus 807 is, for example, a PCI bus. CPU 808 executes a software program stored in the read only memory 809. CPU 808 uses the random access memory 816 for temporary storage.

When the data needs to be forwarded from the main line 711 to the branch line such as 707, the output of MAC 806 is sent to MAC 815 through the internal bus 807. If data buffering is required as described later, CPU 808 temporarily stores the data in RAM 816. Alternatively, the internal memory in MAC 806 or 815 (not shown in FIG. 2) may store the data. The power supply block 830 obtains, for example, DC 5 volts from the AC voltage and supplies to each component.

The PLC bridge 731 builds a table showing which physical address is on which segment (L1 line 711 or the branch L1a). The table may be stored in the RAM 816 or other suitable storage device. The PLC Bridge 731 blocks all the local communications between the AC outlet 771 and 772 to prevent such communications from passing to other branches and consuming bandwidth and time slots in the other branches. Such communications never go outside of the branch L1a unless a device situated on another branch is also addressed. The PLC Bridge 731 passes communications from or to the device on another branch, for example, the AC outlet 773. Usually, most of the AC outlets in a room are on the same branch line or situated close by. Thus, local communications in the room (e.g, from a computer to a printer, or from a video source to a video player) stays on the branch line. By isolating the branches as described, the other branch lines can re-use the same time and frequency allocations for other communications, effectively increasing the network bandwidth.

In accordance with certain embodiments, the PLC bridge such as 731 is housed within the housing of a circuit breaker module as is commonly used household circuit breaker panels. Thus, installation is a simple as replacement or substitution of a conventional circuit breaker with a module containing a circuit breaker as well as a PLC bridge. While FIG. 12 depicts the circuit breaker 732 as being situated on the branch side of the PLC bridge, these components could also be reversed without departing from embodiments consistent with the present invention.

Note that the bridge 731 also performs a signal regeneration function. Usually, a signal from the remote device is attenuated, with attenuation increasing with distance and line mismatches. By regenerating the signal, the destination device receives the signal in good condition on a more frequent basis than would otherwise be obtained. This may be especially significant in a PLC network where wiring conditions are rarely optimal for data communications. As a result, the network coverage may be extended. In addition, the bridge 731 isolates harmful noise on the other side, which is generated by appliances such as a hair dryer, a lamp dimmer, etc. The noise is blocked at the low pass filter 720 to limit the effect of the noise source to the branch in which the noise is created. The other branch lines are thereby kept cleaner of such noise and interference.

In operation, determinations as to time slot and frequencies used for communications between branches can be determined in a manner similar to that described above for the powerline network bridge.

Figure 14:
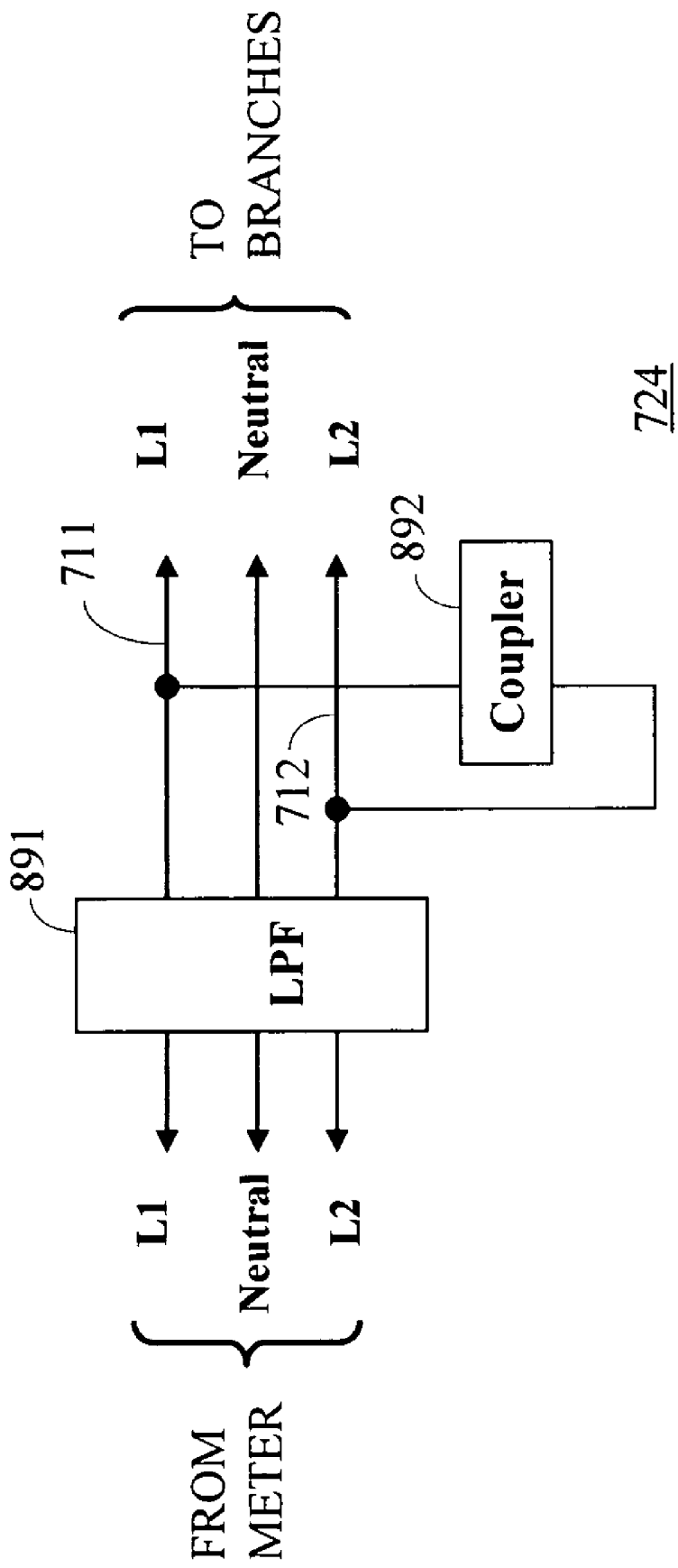
FIG. 14 shows the internal components of an exemplary main PLC unit consistent with embodiments of the present invention.

FIG. 14 shows the internal components of the main PLC unit 724. The low pass filter 891 blocks PLC signals to isolate the internal power lines 711 and 712 from the incoming power lines. The coupler 892 passes PLC signals between the L1 line 711 and the L2 line 712. The coupler 892 can be as simple as an appropriately valued capacitor that appears as a large impedance at power line frequencies (e.g., 60 Hz) and approximates a short circuit at PLC communication frequencies. L1 and L2 signals can remain un-isolated within the main PLC unit 724.

Figure 15:
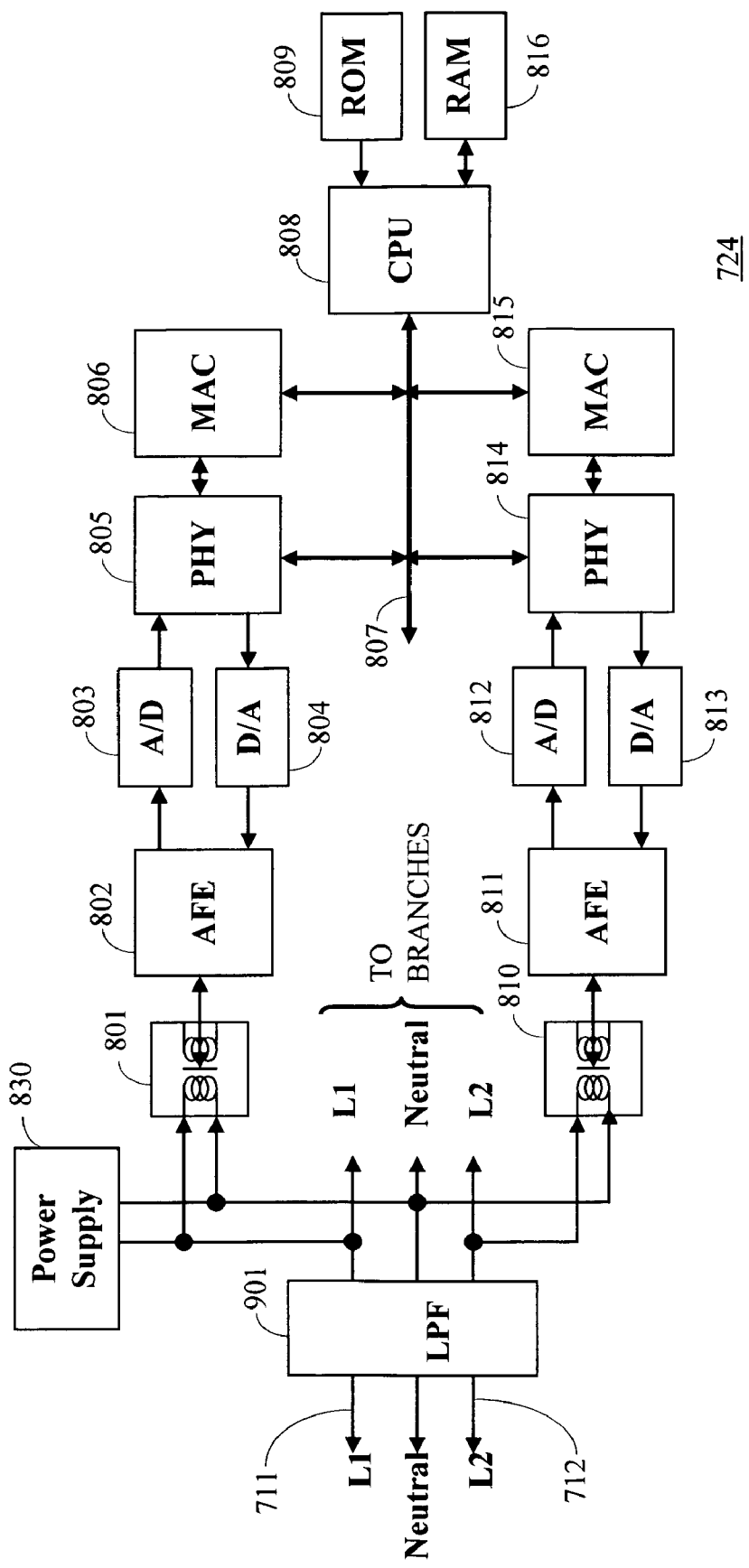
FIG. 15 shows an alternative embodiment for the main PLC Bridge consistent with certain embodiments of the present invention.

FIG. 15 shows an alternative solution for the main PLC Bridge 724. The coupler 892 is replaced with the PLC bridge shown in FIG. 13. The Bridge 724 isolates the L1 line 711 and the L2 line 712. The same bandwidth can be re-usable on the cross-phase line. The low pass filter 901 can be the same as low pass filter 891 in FIG. 14. The components 801 to 816 and 830 are identical to those shown in FIG. 13.

In accordance with certain embodiments, all or many of the hardware components can be integrated into a few semiconductor chips, and the bridge can be implemented into a breaker module that is used in a manner similar to that of a conventional household circuit breaker with the additional functionality of a PLC bridge incorporated therein. Also, in accordance with other embodiments consistent with the present invention, the bridge (e.g., 731) may incorporate router functionality, which filters traffic by logical address.

Thus, in accordance with certain embodiments, a PLC breaker bridge consistent with certain embodiments may have one or more of the following advantages: Each powerline branch is isolated and no local communication reaches the other branches. Network bandwidth will be efficiently re-used. An attenuated signal from the remote device is regenerated for improved error rate. The coverage may be extended. Noise and interference generated on another branch line is isolated to a single branch line. Thus, the other branches are clean and free of such noise interference. By implementing the bridge within a breaker module, only a module change is required for installation or replacement. No new breaker board required. While these advantages may be present in certain embodiments, the failure of any or all of these advantages to be present is not to be used as an indication of reading on the claims to follow.

Thus, a power line communication (PLC) bridge circuit, consistent with certain embodiments, has a first coupler that couples data signals to and from a main power line circuit. A second coupler couples data signals to and from a branch power line circuit, wherein the branch power line circuit is branched from the main power line circuit. A first communication transceiver is connected to the first coupler for transferring data signals to and from the first coupler. A second communication transceiver is connected to the second coupler for transferring data signals to and from the second coupler. A controller examines data signals from the first transceiver and determines if the data is destined for the second transceiver, so that data that is not destined for the second transceiver is considered local data. The controller also examines data signals from the second transceiver and determines if the data is destined for the first transceiver, so that data that is not destined for the first transceiver is also considered local data. A bridge passes data signals between the first communication transceiver and the second transceiver when the controller determines that the data is not local, and passes data signals between the first communication transceiver and the second communication transceiver when the controller determines that the data is local.

In certain embodiments consistent with the invention, the power line communication bridge circuit is housed within a housing that contains a circuit breaker. Thus, a circuit breaker can be coupled between the main power line circuit and the branch power line circuit. Certain embodiments also contemplates a coupler that couples PLC data between power legs of the main power line circuit; and a low pass filter that blocks PLC data from exiting a supply side of the main power line circuit. The coupler and the low pass filter can be situated within a main power line circuit breaker. The bridge can include a common bus that is shared by the first and second communication transceivers, wherein the common bus is controlled by the controller. The first and second communication transceivers comprise orthogonal frequency division multiplexing (OFDM) transceivers. The first and second communication transceivers can be HomePlug® standard compliant transceivers. The processor can identify at least one of an available time slot and an available frequency for passing the data signal between the first and second communication transceivers. The power line communication bridge circuit can also have a beacon generator that generates beacon signals transmitted over the first and second power line circuits, wherein the power line communication bridge circuit serves as a master in the PLC network. The controller can determine whether or not the data is local by consulting a device table. The power line communication bridge circuit consistent with certain embodiments, can further incorporate a filter that isolates the main power line circuit from the branch power line circuit at frequencies used for power line communication. Any or all of these variations can be used interchangeably.

In accordance with another embodiment, a power line communication (PLC) bridge circuit has a first coupler that couples data signals to and from a main power line circuit and a second coupler that couples data signals to and from a branch power line circuit. A first communication transceiver is connected to the first coupler for transferring data signals to and from the first coupler. A second communication transceiver is connected to the second coupler for transferring data signals to and from the second coupler. The first and second communication transceivers can be HomePlug® standard compliant transceivers. A controller examines data signals from the first transceiver and determines if the data is destined for the second transceiver, wherein data that is not destined for the second transceiver is considered local data. The controller also examines data signals from the second transceiver and determines if the data is destined for the first transceiver, wherein data that is not destined for the first transceiver is also considered local data. A common bus is shared by the first and second communication transceivers, wherein the common bus is controlled by the controller. The controller also passes data signals over the common bus between the first communication transceiver and the second transceiver when the controller determines that the data is not local, and does not pass data signals between the first communication transceiver and the second communication transceiver when the controller determines that the data is local, wherein the controller determines whether or not the data is local by consulting a device table. The processor identifies at least one of an available time slot and an available frequency for passing the data signal between the first and second communication transceivers. A filter isolates the first and second power line circuits from each other at frequencies used for power line communication. A circuit breaker is coupled between the main power line circuit and the branch power line circuit and the bridge circuit is housed within a housing that contains a circuit breaker.

In accordance with another embodiment, a power line communication (PLC) bridge circuit has a first coupler that couples data signals to and from a main power line circuit and a second coupler that couples data signals to and from a branch power line circuit. A first communication transceiver is connected to the first coupler for transferring data signals to and from the first coupler. A second communication transceiver is connected to the second coupler for transferring data signals to and from the second coupler. A controller examines data signals from the first transceiver and determines if the data is destined for the second transceiver, wherein data that is not destined for the second transceiver is considered local data. The controller further examines data signals from the second transceiver and determines if the data is destined for the first transceiver, wherein data that is not destined for the first transceiver is also considered local data. A bridge circuit passes data signals between the first communication transceiver and the second transceiver when the controller determines that the data is not local, and does not pass data signals between the first communication transceiver and the second communication transceiver when the controller determines that the data is local. A circuit breaker is coupled between the main power line circuit and the branch power line circuit, wherein the bridge circuit is housed within a housing that contains a circuit breaker.

In accordance with certain embodiments, the power line communication bridge circuit described uses a common bus shared by the first and second communication transceivers, wherein the common bus is controlled by the controller, to pass data between the transceivers. The first and second communication transceivers comprise orthogonal frequency division multiplexing transceivers which may be HomePlug® standard compliant transceivers. The processor may be used to identify at least one of an available time slot and an available frequency for passing the data signal between the first and second communication transceivers. A beacon generator can be provided to generate beacon signals transmitted over the first and second power line circuits, wherein the power line communication bridge circuit serves as a master in the PLC network. The controller can determine whether or not the data is local by consulting a device table, or can use any other suitable mechanism. The power line communication bridge circuit can further have a filter that isolates the first and second power line circuits from each other at frequencies used for power line communication.

A power line communication (PLC) bridging method consistent with certain embodiments involves receiving data from a main power line circuit and a branch power line circuit branching from the main power line circuit; examining data signals from the branch power line circuit to determine if the data is destined for the branch power line circuit, and if so not passing the data to the main power line circuit, and if not then passing data to the main power line circuit; and examining data signals from the main power line circuit to determine if the data is destined for the branch power line circuit, wherein if the data is destined for the branch power line circuit then passing the data to the branch power line circuit and if not, the then not passing data to the branch power line circuit.

In certain embodiments of the method, the data signals are passed over a common bus shared by first and second communication transceivers. The data signals may comprise orthogonal frequency division multiplexed signals. The data signals may be HomePlug® standard compliant data signals. The power line communication method can further involve identifying at least one of an available time slot and an available frequency for passing the data signal between the first and second power line circuit. The destination of the data can be determined by consulting a device table. The method can further involve determining if an amount of current passing to the branch circuit exceeds a threshold, and if so, opening a circuit breaker. The method can be carried out within a device that houses both a circuit breaker and a power line communication bridge. The device that houses both the circuit breaker and the power line communication bridge can be a circuit breaker module housing. The method can be carried out using a computer readable storage medium storing instructions which, when executed on a programmed processor, carry out the process.

Those skilled in the art will recognize, upon consideration of the above teachings, that certain of the above exemplary embodiments are based upon use of a programmed processor such as CPU 508 or 808. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A power line communication (PLC) bridge circuit, comprising:
    a plurality of branch power line circuits branching from a main power line circuit;
    a main coupler that couples data signals to and from the power line circuit to and from each of the branch power line circuits, wherein alternating current power is provided to the main power line through a watt-hour meter;
    a main blocking filter that prevents signals in a frequency range of the data signals from reaching the watt-hour meter;
    a first and a second branch coupler that couples data signals to and from first and second ones of the branch power line circuits;
    a first and a second branch blocking filter that prevents signals in the frequency range of the data signals from entering or exiting the first and second branch power line circuits respectively;
    a first communication transceiver connected to the first branch coupler for transferring data signals to and from the first branch coupler;
    a second communication transceiver connected to the second branch coupler for transferring data signals to and from the second branch coupler;
    a controller that examines data signals from the first transceiver and determines if the data is destined for the second transceiver, wherein data that is not destined for the second transceiver is considered local data;
    the controller further examines data signals from the second transceiver and determines if the data is destined for the first transceiver, wherein data that is not destined for the first transceiver is also considered local data;
    bridging means for passing data signals between the first communication transceiver and the second transceiver when the controller determines that the data is not local, and for not passing data signals between the first communication transceiver and the second communication transceiver when the controller determines that the data is local; and
    wherein the controller and the bridging means are housed within a housing that contains a circuit breaker.

2. The power line communication bridge circuit in accordance with claim 1, wherein the main blocking filter and the main coupler are housed within a housing that contains a main circuit breaker.

3. The power line communication bridge circuit in accordance with claim 1, further comprising a branch circuit breaker, coupled between the main power line circuit and one of the branch power line circuits.

4. The power line communication bridge circuit in accordance with claim 1, wherein the main coupler couples PLC data between power legs of the main power line circuit.

5. The power line communication bridge circuit in accordance with claim 1, wherein the main coupler and the main blocking filter are situated within a main power line circuit breaker.

6. The power line communication bridge circuit in accordance with claim 1, wherein the bridging means for passing data signals comprises a common bus shared by the first and second communication transceivers, wherein the common bus is controlled by the controller.

7. The power line communication bridge circuit in accordance with claim 1, wherein the first and second communication transceivers comprise orthogonal frequency division multiplexing (OFDM) transceivers.

8. The power line communication bridge circuit in accordance with claim 1, wherein the first and second communication transceivers comprise HomePlug® standard compliant transceivers.

9. The power line communication bridge circuit in accordance with claim 1, wherein the controller identifies at least one of an available time slot and an available frequency for passing the data signal between the first and second communication transceivers.

10. The power line communication bridge circuit in accordance with claim 1, further comprising a beacon generator that generates beacon signals transmitted over the first and second power line circuits, wherein the power line communication bridge circuit serves as a master in the PLC network.

11. The power line communication bridge circuit in accordance with claim 1, wherein the controller determines whether or not the data is local by consulting a device table.

12. The power line communication bridge circuit in accordance with claim 1, wherein said first and second branch blocking filters comprise low pass filters.

13. A power line communication (PLC) bridge circuit, comprising:
 a plurality of branch power line circuits branching from a main power line circuit;
 a main coupler that couples data signals to and from the power line circuit to and from each of the branch power line circuits, wherein alternating current power is provided to the main power line through a watt-hour meter;
 a main blocking filter that prevents signals in a frequency range of the data signals from reaching the watt-hour meter;
 a first and a second branch coupler that couples data signals to and from first and second ones of the branch power line circuits;
 a first and a second branch blocking filter that prevents signals in the frequency range of the data signals from entering or exiting the first and second branch power line circuits respectively;
 a first communication transceiver connected to the first branch coupler for transferring data signals to and from the first branch coupler;
 a second communication transceiver connected to the second branch coupler for transferring data signals to and from the second branch coupler;
 wherein the first and second communication transceivers comprise HomePlug® standard compliant transceivers;
 a controller that examines data signals from the first transceiver and determines if the data is destined for the second transceiver, wherein data that is not destined for the second transceiver is considered local data;
 the controller further examines data signals from the second transceiver and determines if the data is destined for the first transceiver, wherein data that is not destined for the first transceiver is also considered local data;
 a common bus shared by the first and second communication transceivers, wherein the common bus is controlled by the controller;
 wherein the controller further passes data signals over the common bus between the first communication transceiver and the second transceiver when the controller determines that the data is not local, and for not passing data signals between the first communication transceiver and the second communication transceiver when the controller determines that the data is local, wherein the controller determines whether or not the data is local by consulting a device table;
 wherein the controller identifies at least one of an available time slot and an available frequency for passing the data signal between the first and second communication transceivers; and
 a circuit breaker, coupled between the main power line circuit and one of the first and second branch power line circuits, wherein the bridge circuit is housed within a housing that contains the circuit breaker.

14. A power line communication (PLC) bridge circuit, comprising:
 a plurality of branch power line circuits branching from a main power line circuit;
 a main coupler that couples data signals to and from the power line circuit to and from each of the branch power line circuits, wherein alternating current power is provided to the main power line through a watt-hour meter;
 a main blocking filter that prevents signals in a frequency range of the data signals from reaching the watt-hour meter;
 a first and a second branch coupler that couples data signals to and from first and second ones of the branch power line circuits;
 a first and a second branch blocking filter that prevents signals in the frequency range of the data signals from entering or exiting the first and second branch power line circuits respectively;
 a first communication transceiver connected to the first branch coupler for transferring data signals to and from the first branch coupler;
 a second communication transceiver connected to the second branch coupler for transferring data signals to and from the second branch coupler;
 a controller that examines data signals from the first transceiver and determines if the data is destined for the second transceiver, wherein data that is not destined for the second transceiver is considered local data;
 the controller further examines data signals from the second transceiver and determines if the data is destined for the first transceiver, wherein data that is not destined for the first transceiver is also considered local data;
 bridging means for passing data signals between the first communication transceiver and the second transceiver when the controller determines that the data is not local, and for not passing data signals between the first communication transceiver and the second communication transceiver when the controller determines that the data is local; and
 a first branch circuit breaker, coupled between the main power line circuit and the first branch power line circuit, wherein the bridge circuit and the controller are housed within a housing that contains a circuit breaker.

15. The power line communication bridge circuit in accordance with claim 14, wherein the means for passing data signals comprises a common bus shared by the first and second communication transceivers, wherein the common bus is controlled by the controller.

16. The power line communication bridge circuit in accordance with claim 14, wherein the first and second communication transceivers comprise orthogonal frequency division multiplexing transceivers.

17. The power line communication bridge circuit in accordance with claim 14, wherein the first and second communication transceivers comprise HomePlug® standard compliant transceivers.

18. The power line communication bridge circuit in accordance with claim 14, wherein the controller identifies at least one of an available time slot and an available frequency for passing the data signal between the first and second communication transceivers.

19. The power line communication bridge circuit in accordance with claim 18, further comprising a beacon generator that generates beacon signals transmitted over the first and second power line circuits, wherein the power line communication bridge circuit serves as a master in the PLC network.

20. The power line communication bridge circuit in accordance with claim 14, wherein the controller determines whether or not the data is local by consulting a device table.

21. The power line communication bridge circuit in accordance with claim 14, further comprising a filter that isolates the first and second power line circuits from each other at frequencies used for power line communication.

22. A power line communication (PLC) bridging method, comprising:

providing a plurality of branch power line circuits branching from a main power line circuit;

coupling data signals to and from each of the branch power line circuits, wherein alternating current power is provided to the main power line through a watt-hour meter;

preventing signals in a frequency range of the data signals from reaching the watt-hour meter;

examining data signals from the branch power line circuit to determine if the data is destined for the branch power line circuit, and if so not passing the data to the main power line circuit, and if not then passing data to the main power line circuit; and examining data signals from the main power line circuit to determine if the data is destined for the branch power line circuit, wherein if the data is destined for the branch power line circuit then passing the data to the branch power line circuit and if not, the then not passing data to the branch power line circuit.

23. The power line communication method in accordance with claim 22, wherein the data signals are passed over a common bus shared by first and second communication transceivers.

24. The power line communication method in accordance with claim 23, wherein the data signals comprise orthogonal frequency division multiplexing signals.

25. The power line communication method in accordance with claim 23, wherein the data signals comprise Home-Plug® standard compliant data signals.

26. The power line communication method in accordance with claim 22, further comprising identifying at least one of an available time slot and an available frequency for passing the data signal between the first and second power line circuit.

27. The power line communication method in accordance with claim 22, wherein the destination of the data is determined by consulting a device table.

28. The power line communication method in accordance with claim 22, further comprising determining if an amount of current passing to the branch circuit exceeds a threshold, and if so, opening a circuit breaker.

29. The power line communication method according to claim 22, carried out within a device that houses both a circuit breaker and a power line communication bridge.

30. The power line communication method according to claim 29, wherein the device that houses both the circuit breaker and the power line communication bridge comprises a circuit breaker module housing.

31. A computer readable storage medium storing instructions which, when executed on a programmed processor, carry out a process in accordance with claim 22.

* * * * *

UNITED STATES PATENT AND TRADEMARK OFFICE
CERTIFICATE OF CORRECTION

| | |
|---|---|
| PATENT NO. | : 7,463,877 B2 |
| APPLICATION NO. | : 11/378022 |
| DATED | : December 9, 2008 |
| INVENTOR(S) | : Iwamura |

It is certified that error appears in the above-identified patent and that said Letters Patent is hereby corrected as shown below:

On the title page, Item (73) Under Assignees, please delete "Sony Corporation Inc., Park Ridge, NJ" and insert -- Sony Electronics Inc., Park Ridge, NJ -- therefor.

Signed and Sealed this

Seventeenth Day of February, 2009

JOHN DOLL
*Acting Director of the United States Patent and Trademark Office*